United States Patent [19]

Muschelknautz et al.

[11] 4,219,380

[45] Aug. 26, 1980

[54] DEVICE AND PROCESS FOR COOLING LIQUIDS CONTAINING SOLIDS

[75] Inventors: Edgar Muschelknautz, Leverkusen; Rudolf Juse, Dormagen, both of Fed. Rep. of Germany

[73] Assignee: Bayer Atkiengesellschaft, Leverkusen, Fed. Rep. of Germany

[21] Appl. No.: 886,495

[22] Filed: Mar. 14, 1978

Related U.S. Application Data

[63] Continuation of Ser. No. 775,212, Mar. 7, 1977, abandoned, which is a continuation of Ser. No. 681,923, Apr. 30, 1976, abandoned, which is a continuation of Ser. No. 506,626, Sep. 16, 1974, abandoned.

[30] Foreign Application Priority Data

Dec. 8, 1973 [DE] Fed. Rep. of Germany ....... 2361236

[51] Int. Cl.² ............................................. B01D 1/00
[52] U.S. Cl. ................................ 159/47 R; 159/2 R; 159/6 R; 203/88
[58] Field of Search .............. 159/4 R, 4 A, 4 B, 4 C, 159/4 D, 4 F, 4 GC, 4 J, 9, 47, 48, 2 R, 6 R; 208/361, 352; 203/88

[56] References Cited

U.S. PATENT DOCUMENTS

| | | | |
|---|---|---|---|
| 2,726,198 | 12/1955 | Lowman, Jr. et al. | 159/2 R |
| 3,188,783 | 6/1965 | Savage | 159/2 R |
| 3,331,306 | 7/1967 | Hutton et al. | 159/4 B |
| 3,414,980 | 12/1968 | Nezbed | 159/4 R |
| 3,941,664 | 3/1976 | Scoggin | 159/2 R |

FOREIGN PATENT DOCUMENTS 714367 7/1965 Canada ..................................... 55/459

OTHER PUBLICATIONS

Chemical Engineer's Handbook, John H. Perry, pp. 841, 842, 1950, 3rd ed.

Primary Examiner—Norman Yudkoff
Attorney, Agent, or Firm—Sprung, Felfe, Horn, Lynch & Kramer

[57] ABSTRACT

The invention relates to a device for cooling liquids containing solids by expansion comprising of cyclone which consists of an inlet chamber and a separating part, the cross-section of the inlet chamber being 5 to 30 times greater than that of the product delivery pipe which opens into the inlet chamber, and said inlet chamber before opening into the ring chamber becoming continuously reduced in width and continuously increased in height, and the separating part, to which the inlet chamber is tangentially attached, consisting of a ring chamber below which there is a separating cylinder of smaller diameter, these two parts being connected by a sloping surface.

4 Claims, 4 Drawing Figures

DEVICE AND PROCESS FOR COOLING LIQUIDS CONTAINING SOLIDS

This is a continuation, of application Ser. No. 775,212, filed Mar. 7, 1977, which is a continuation of Ser. No. 681,923 filed Apr. 30, 1976, which is continuation of Ser. No. 506,626 filed Sept. 16, 1974 all abandoned.

BACKGROUND

The invention relates to a device and a process for cooling liquids containing solids by expansion with the aid of a cyclone, the vapours which form being free of droplets and solids particles.

A particular embodiment of the process according to the invention relates to a process for cooling waste water containing solids particles, which forms in the production of propylene oxide according to the propylene chlorohydrin process, hereafter called "saponifier effluent."

The known processes for cooling liquids containing solids by means of heat exchangers prove unsuitable, since the solids contained in the liquid to be cooled are deposited on the surfaces of the heat exchangers, thus causing a reduction in thermal conductivity and uneconomic cleaning costs and stoppages.

Furthermore, the processes known per se for the flash evaporation of liquids with the aid of cyclone-like containers for cooling liquids containing solids also prove unsuitable, since the special flow properties of a liquid containing vapour bubbles leads to atomization at the entrance and on the walls of apparatus of conventional design. Since the drops contain solids particles, hard deposits which are very difficult to remove, form on unrinsed areas (e.g. on the cover, in the vapour discharge pipe, or in the heat exchangers installed for recovering heat).

SUMMARY

Surprisingly, it has now been found that liquids containing solids can be subjected for cooling to flash evaporation, if the evaporation and subsequent separation of liquid containing solids and vapours takes place in separate areas in such a manner that a fall in pressure to below the vapour pressure of the liquid to be cooled causes sudden evaporation to take place, and the liquid and gaseous phase thus obtained are separated immediately thereafter by centrifugal force.

The subject matter of the present invention further relates to a cyclone for the flash evaporation of liquids containing solids which consists of an inlet chamber and a separating part, the cross-section of the inlet chamber being 5 to 30 times greater than that of the (feed delivery) pipe which opens into the inlet chamber, and said inlet chamber before opening into the ring chamber becoming continuously reduced in width and continuosly increased in height, and the separating part, to which the inlet chamber is tangentially attached, consisting of a ring chamber below which there is a separating cylinder of smaller diameter, these two parts being connected by a sloping surface.

DESCRIPTION OF THE DRAWING

The present invention will be more fully understood from the accompanying drawing wherein.

DESCRIPTION

Figures 1, 2, 3:
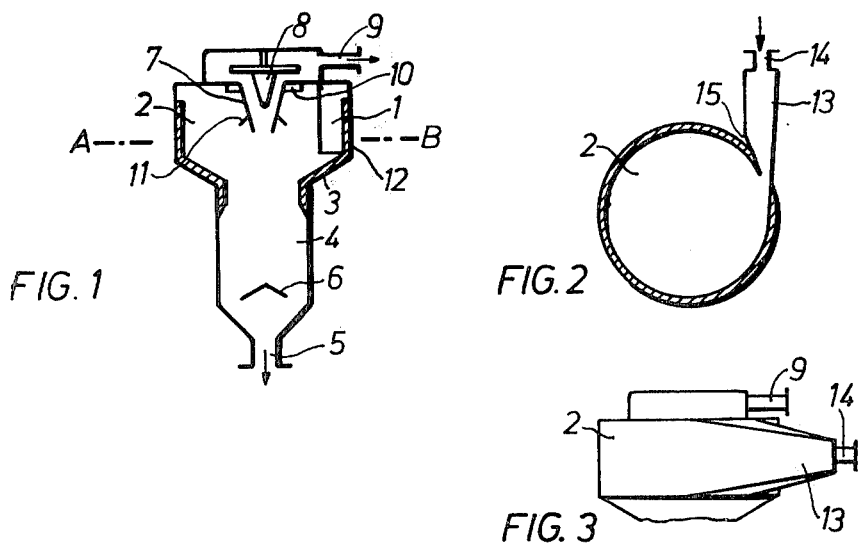
FIG. 1 is a schematic longitudinal section through the cyclone in accordance with the invention.
FIG. 2 is a cross-section through the ring chamber in the plane A–B shown in FIG. 1.
FIG. 3 is a side view of the ring chamber facing towards the inlet chamber.

The cross-section of the inlet chamber in which practically the entire evaporation takes place, is generally 5 to 30 times, preferably 8 to 20 times greater than that of the product delivery pipe which opens into the inlet chamber. It is advantageous if the cross-section is suddenly enlarged at the entry point of the feed delivery pipe.

The inlet chamber is in general so dimensioned that the ratio of its outer length to its greatest height is in the range of about 1.5 to 4.0, preferably in the range of about 2.8 to 3.4. The continuous reduction in width or increase in height of the inlet chamber is generally carried out so that the cross-sectional area remains about constant.

The separation of the gaseous phase formed during evaporation from the liquid phase containing solids takes place in the separating part by centrifugal force which acts on the solids and liquid when circulating in the ring chamber.

The inlet chamber is attached to the ring chamber in such a manner that the outer side-wall of the inlet chamber joins the ring chamber tangentially. It has proved particularly advantageous if the inner side-wall of the inlet chamber is shaped so as to form an angle $\beta$ with the original direction of the inner side-wall in the region of the entrance to the ring chamber (cf. FIG. 2, numeral 15). This angle is generally such that the deviation in relation to the original direction of the inner side-wall is about 1° to 45°, preferably about 5° to 30°. The angle is preferably shaped so that the cross-sectional area of the inlet chamber is reduced by approximately 10% with respect to the embodiment without such an angle.

In accordance with a special embodiment of the cyclone according to the invention, the inlet chamber may also have curved side-walls instead of flat side-walls, the outer side-wall of the inlet chamber which joins the ring chamber tangentially, having a greater radius of curvature than its opposite inner side-wall. A further advantageous embodiment of the cyclone according to the invention consists in that the inner side-wall of the inlet chamber is extended into the inlet ring chamber so that a deflecting plate is formed projecting into the ring chamber which is arranged almost parallel to the outer side wall of the inlet chamber. In general, the height of the deflection plate, which remains constant or tapers towards the free end, is 30 to 70%, preferably 40 to 60%, of the height of the inlet chamber and the length of the dividing plate is 50 to 130%, preferably 70 to 90%, of the difference in length of the inner and outer side-wall of the inlet chamber.

The inclination of the underside of the inlet chamber to the horizontal is adapted in each case to the dimensions of the apparatus and designed in such a way that the desired action of the cyclone is achieved through circulation of the liquid in the ring chamber. The angle $\alpha$ formed by the underside of the inlet chamber and the horizontal is generally in the range of about 3° to 40°, preferably about 5° to 15°.

The dimensions of the sloping surface are dependent on throughput, condition of flow and size of the apparatus and can be determined in each particular case by model tests. In general, excellent results are obtained if the following, empirically determined relationship is used for this angle $$tg\alpha = b/2g,$$

where $\alpha$ is the angle formed by the sloping surface to the horizontal, b is the centrifugal acceleration of a water drop and g is the acceleration due to gravity. The cross section of the entrance of the ring chamber should be at most 80% of the cross-section of the sloping surface.

The inner side wall of the ring chamber, the sloping surface and the upper part of the separating chamber are advantageously lined with wear-resistant material, e.g. with cast basalt. The transition from the lining to the wall of the separating chamber should be kept as flat as possible, i.e. less than 30° to the vertical.

As an obvious, further embodiment of the cyclone according to the invention there may be mentioned a vapour outlet which is arranged in the centre of the cover to the ring chamber and which is cylindrical or conical in shape, and further the liquid outlet which may be arranged in the centre or tangentially in the direction of flow at the lower end of the separating chamber, a conical vortex shield being expediently placed in the axis of the cyclone over the outlet for the liquid. The vapour outlet can of course be provided in a manner known per se with an arrangement for recovery of rotational energy. It has also proved advantageous to provide the vapour outlet with a collar and to arrange a rim around the cover of the ring chamber between the outer wall and vapour outlet in order to prevent the liquid which creeps along the cover and vapour outlet from entering into the vapour outlet for leading off the vapours.

A cyclone in accordance with the invention will now be explained in further detail with reference to FIGS. 1 to 3.

FIG. 1 is a schematic longitudinal section through the cyclone in accordance with the invention. The numeral (1) designates the opening of the inlet chamber into the ring chamber (2). The sloping surface (3) slopes at angle $\delta$ and connects the ring chamber with the separating chamber (4). Numeral (5) denotes the outlet for the liquid, numeral (6) a conical vortex shield over said outlet and numeral (7) the outlet for the vapours, which leave the cyclone through pipe (9) after passing through a device 8 for the recovery of rotational energy. Numeral (10) designates a rim and numeral (11) a collar fitted around the vapour outlet (7). The wall of the ring chamber (2), the sloping surface (3) and the upper part of the separating chamber (4) are protected by a wear-resistant lining (12).

FIG. 2 is a cross-sectional through the ring chamber (2) in the plane A-B shown in FIG. 1, to which the inlet chamber (13) with the inlet (14) for the liquid is tangentially attached. Numeral (15) designates the part of the inner side-wall of the inlet chamber (13) which is bent at angle $\beta$ towards the outer side-wall.

FIG. 3 is a side view of ring chamber (2) looking at the tangentially attached inlet chamber (13) from the side. The remaining numerals have the aforegoing meaning.

The flash expansion with the aid of the cyclone in accordance with the invention proceeds in such a way that the liquid containing solids is conducted from the delivery pipe (14) into the inlet chamber (13), spontaneous evaporation then taking place. The mixture of liquid, vapour and solids continues to flow into the ring chamber (2), a ring of liquid circulating around the wall of the ring chamber and on the sloping surface, said mixture uniformly flowing over the lower edge of the sloping surface into the separating chamber. The drops which are formed during the spontaneous evaporation and transported along in the gas stream are spun out in the ring chamber and the separating chamber by centrifugal force and strike against the walls, where they are absorbed by the liquid there. Liquid, which flows inwards in the region of the cover and vapour outlet (7), is drawn at the ring (10) or at the collar (11) into the gas stream and spun out by centrifugal force onto the walls. Renewed whirling up of already deposited liquid over the outlet (5) can be prevented by means of a conical vortex shield (6). Solids and liquid are drawn off through outlet (5). The pure gas freed of liquid and solids leaves the cyclone by the vapour outlet (7).

The cyclone in accordance with the invention can be used for the flash evaporation of any liquids containing solids. Thus, the present invention also relates to a process for flash evaporation of liquids containing solids which is characterized by the use of the cyclone according to the invention.

Liquids containing solids, which are subjected to the process according to the invention for flash evaporation, may be any two-phase mixtures of liquids and solids with good flow properties. The particle size of the solids in such two-phase mixtures is preferably less than 100 $\mu$m. The solids may be suspended prior to cooling, e.g. in the form of insoluble compounds in the liquid or they may be precipitated from the solution which becomes supersaturated upon cooling. Particularly good results were obtained upon the flash evaporation of aqueous suspension or solutions.

In accordance with a special use of the process according to the invention, the effluent of the saponifier bottom, which formed in the production of propylene oxide according to the propylene chlorhydrin process, is subjected to single or multi-stage flash evaporation with the aid of the cyclone according to the invention. The effluent of the saponifier bottom, which forms in the production of propylene oxide, constitutes in general a suspension of calcium oxide and calcium carbonate as well as other scarely soluble oxides in an aqueous solution of calcium chloride. The resulting vapours which are practically free of solids may be conducted for further cooling to an indirect heat exchanger or mixing condenser.

Figure 4:
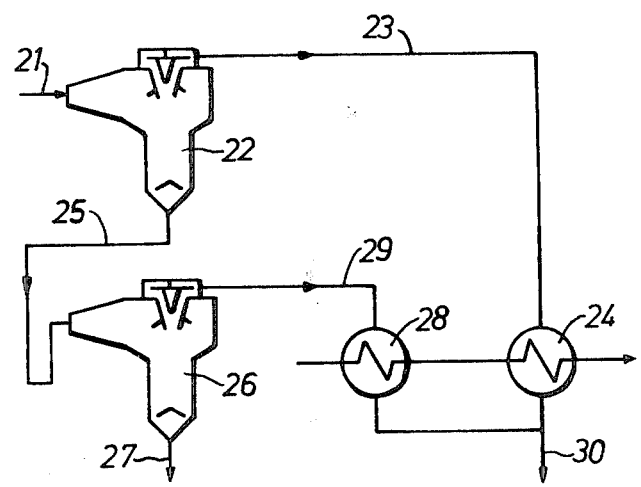
FIG. 4 is a flow sheet concerning the use of the cyclone for the cooling of the saponifier effluent according to a particular embodiment of the invention.

The saponifier effluent which forms in the production of propylene oxide according to the chlorhydrin process, can be subjected, for example, to a two-stage flash evaporation in accordance with the flow sheet in FIG. 4. The saponifier effluent is thereafter conducted via pipe (21) to a preliminary evaporation stage in cyclone (22), in which part of the water is evaporated and then conveyed via pipe (23) to a heat exchanger (24). The effluent of the saponifier bottom, which is cooled in the first evaporation stage, can be directed for further cooling via pipe (25) to a second evaporation stage in another cyclone (26), in which it is further cooled and leaves the cyclone via pipe (27). The vapours from cyclone (26) can likewise be conveyed to a heat-exchanger (28) via pipe (29) and, together with the vapours from the first evaporation stage, can be taken off over pipe (30) as a pure condensate.

The advantages of the process in accordance with the invention consist in that liquids containing solids can be cooled by flash evaporation in an economic manner with maximum possible evaporation and minimum possible pressure loss, and the vapours and liquids thus obtained can be so separated from one another that the vapours are free of droplets and solids particles, so that delivery and discharge pipes as well as the walls of the apparatus used according to the process of the invention stay free of solids deposits and no stoppages in operation are necessary for cleaning.

The device and the process according to the invention is illustrated by the following Examples.

EXAMPLES

Example 1

215 m³/h of effluent of the saponifier bottom from the propylene oxide production were cooled from 115° C. to 81° C. by flash evaporation with the aid of the cyclone in accordance with the invention. The effluent of the saponifier bottom contained a total of approximately 5 kg/cm³ of insoluble calcium oxide and calcium carbonate and approximately 50 kg/m³ of dissolved calcium chloride. The particle size of the solids particles lay in the range of approximately 0.5 to 15 μm.

The flash evaporation is performed in two stages: in the first stage a pressure of 1.0 bar is maintained, and in the second stage a pressure of 0.5 bar. The cyclone of the same dimensions was employed in both flash-evaporation stages. The total height of the cyclone was 5400 mm, the inlet ring chamber had a diameter of 2400 mm and a height of 2500 mm, the sloping surface had an angle γ of inclination of 25° and the separating chamber had a diameter of 1400 mm and a height of 1800 mm. The cross-section of the inlet chamber at the opening for the feed delivery pipe was 17 times larger than that of the feed delivery pipe which had a diameter of 200 mm. At the entrance to the ring chamber, the inlet chamber had a width of 385 mm and a height of 1300 mm. The underside of the inlet chamber was at an angle α of 7° to the plane of the ring chamber. The inner side-wall of the inlet chamber was shaped so as to form an angle with the original direction of the inner side-wall in the region of the entrance to the ring chamber, so that the deviation β of this part from the original direction of the inner side-wall was 7°. The vapour outlet had a diameter of 575 mm and was provided with a device for recovering rotational energy. The inner wall of the ring chamber, the sloping surface as well as the upper section of the separating chamber were lined with wear-resistant material.

In the first stage of flash evaporation 5600 kg/h of vapour were produced, and in the second stage 7600 kg/h of vapour which was condensed in a mixing condenser. The total loss of pressure from the cyclone flashing separator was approximately 2 to 6 mm Hg.

Less than 5 mg of solids per kg of vapour were detectable in the vapours which were led off. After an operating period of approximately 18 months the walls of the cyclone as well as the pipes for the vapours were still found to be free of any deposits.

Example 2

590 m³/h of waste water, which contained about 50 kg/m³ of NaCl, 100 kg/m³ of NaCl₂ and 10 kg/m³ of sand with a mean particle size of 7 μm, were cooled from 84° C. to 45° C. by flash evaporation with the aid of cyclones in accordance with the invention.

The flash evaporation was carried out in 3 stages, a pressure of 0.2 bar being maintained in the first stage, a pressure of 0.13 bar in the second stage and a pressure of 0.078 bar in the third stage.

All 3 stages were performed in cyclones of the same dimensions, with the exception of the dimensions of the opening into the ring chamber of the second stage. The overall height of the cyclone employed was 7800 mm, the ring chamber had a diameter of 4700 mm and a height of 2400 mm, the sloping surface had an angle γ of inclination of 15°, the separating chamber had a diameter of 2800 mm and a height of 4800 mm. The cross-section of the inlet chamber at the opening for the product delivery pipe was 20 times larger than that of the product delivery pipe which had a diameter of 350 mm. At the entrance of the inlet ring chamber, the inlet chamber had a width of 810 mm and a height of 2400 mm (except for the second stage which was 1800 mm high). The underside of the inlet chamber was at an angle γ of 9° to the horizontal. The inner side-wall of the inlet chamber was shaped so as to form an angle with the original direction of the inner side-wall in the region of the entrance to the ring chamber, so that the deviation β of this part from the original direction of the inner side-wall was 12°. The inner surface was extended into the ring chamber by a deflecting plate fitted onto the sloping surface. The height of said plate fell from 1800 mm to 1400 mm at the end and had a length of 1400 mm. The vapour outlet had a diameter of 1200 mm. The wall of the ring chamber as well as the sloping surface were lined with wear-resistant material.

In the first stage of flash evaporation 17800 kg/h of vapour were produced, in the second stage 8000 kg/h of vapour and in the third stage 9700 kg/h of vapour which was condensed in a condenser. The total pressure loss from the cyclone flashing separator was approximately 2 to 5 mm Hg.

Less than 20 mg of solids per kg of vapour were detectable in the vapours which were led off. After an operating period of approximately 6 months, the walls of the cyclone as well as the pipes was still found to be free of deposits.

What is claimed is:

1. A process for the flash evaporation of a liquid containing solids, characterized in that the evaporation and subsequent separation of said liquid containing solids and resultant vapours is carried out in separate areas in such a manner that a reduction in pressure to below the vapour pressure of said liquid causes sudden evaporation, and the liquid and gaseous phase thus obtained are separated immediately thereafter by centrifugal force.

2. A process according to claim 1 wherein the reduction in pressure to below the vapor pressure of said liquid is carried out in such a way that both a sudden and complete evaporation occurs.

3. A process according to claim 1 wherein said liquid containing solids is flashed evaporated in a cyclone which consists essentially of an inlet chamber, a separating part, a feed delivery pipe opening into said inlet chamber wherein the cross-section of said inlet chamber is 5 to 30 times greater than that of the feed delivery pipe wherein said inlet chamber is tangentially attached to said separating part and said separating part comprises a ring chamber below which there is a separating cylinder of smaller diameter, said separating cylinder having therebeneath a funnel shaped member, said separating part having an inverted conical surface connecting said ring chamber and said separating cylinder, said inlet chamber before opening into said ring chamber becoming continuously reduced in width and continuously increased in height, said liquid containing solids being passed through said feed delivery pipe, said inlet chamber and into said separating part whereby said liquid is partly evaporated only in said inlet chamber and the remaining liquid containing the said solids passed downwardly over the wall of the ring chamber, the wall of said inverted conical surface and the wall of said separating cylinder of smaller diameter and passed out through the funnel shaped member.

4. A process according to claim 3 wherein said feed delivery pipe is coaxial with said inlet chamber.

* * * * *